(12) United States Patent
Blecon et al.

(10) Patent No.: US 9,853,932 B2
(45) Date of Patent: Dec. 26, 2017

(54) PROCESS FOR SENDING AN ELECTRONIC FILE TO AT LEAST ONE CONTACT OF A USER

(71) Applicants: Stéphane M. Blecon, Bohars (FR);
Stéphane M. Hervochon, Brest (FR);
Frédéric M. Thomas, Finistere (FR)

(72) Inventors: Stéphane M. Blecon, Bohars (FR);
Stéphane M. Hervochon, Brest (FR);
Frédéric M. Thomas, Finistere (FR)

(73) Assignee: GENESYS TELECOMMUNICATIONS LABORATORIES, INC., Daly City, CA (US)

( * ) Notice: Subject to any disclaimer, the term of this patent is extended or adjusted under 35 U.S.C. 154(b) by 78 days.

(21) Appl. No.: 13/786,229

(22) Filed: Mar. 5, 2013

(65) Prior Publication Data

US 2013/0282842 A1    Oct. 24, 2013

(30) Foreign Application Priority Data

Mar. 6, 2012   (EP) ..................................... 12305272

(51) Int. Cl.
  *G06F 15/16* (2006.01)
  *H04L 12/58* (2006.01)

(52) U.S. Cl.
  CPC .............. *H04L 51/28* (2013.01); *H04L 51/00* (2013.01)

(58) Field of Classification Search
  USPC ................................................. 709/206, 200
  See application file for complete search history.

(56) References Cited

U.S. PATENT DOCUMENTS

| | | | |
|---|---|---|---|
| 2004/0185877 A1* | 9/2004 | Asthana et al. | 455/456.6 |
| 2007/0237314 A1 | 10/2007 | Henry et al. | |
| 2008/0089489 A1* | 4/2008 | Katkam et al. | 379/88.13 |
| 2009/0313299 A1* | 12/2009 | Bonev et al. | 707/103 R |
| 2010/0286977 A1* | 11/2010 | Chin | G06F 17/289 704/4 |
| 2011/0098917 A1* | 4/2011 | LeBeau et al. | 701/201 |
| 2013/0311589 A1* | 11/2013 | Feng | H04L 51/28 709/206 |

OTHER PUBLICATIONS

Extended European Search Report dated Aug. 17, 2012, for European Application No. 12305272.2, 5 pgs.

* cited by examiner

*Primary Examiner* — El Hadji Sall
(74) *Attorney, Agent, or Firm* — Lewis Roca Rothgerber Christie LLP

(57) ABSTRACT

Process for sending an electronic file to at least one contact (1) of a user (2), said process providing for the activation by said user of a sharing function, said process further providing for, upon said activation:
  parsing said electronic file for detecting information about said contact;
  checking in at least a contact directory the existence of an electronic address matching with said information;
  creating an electronic message (5) comprising at least said electronic file and said electronic address;
  sending said electronic message to said contact through said electronic address.

21 Claims, 1 Drawing Sheet

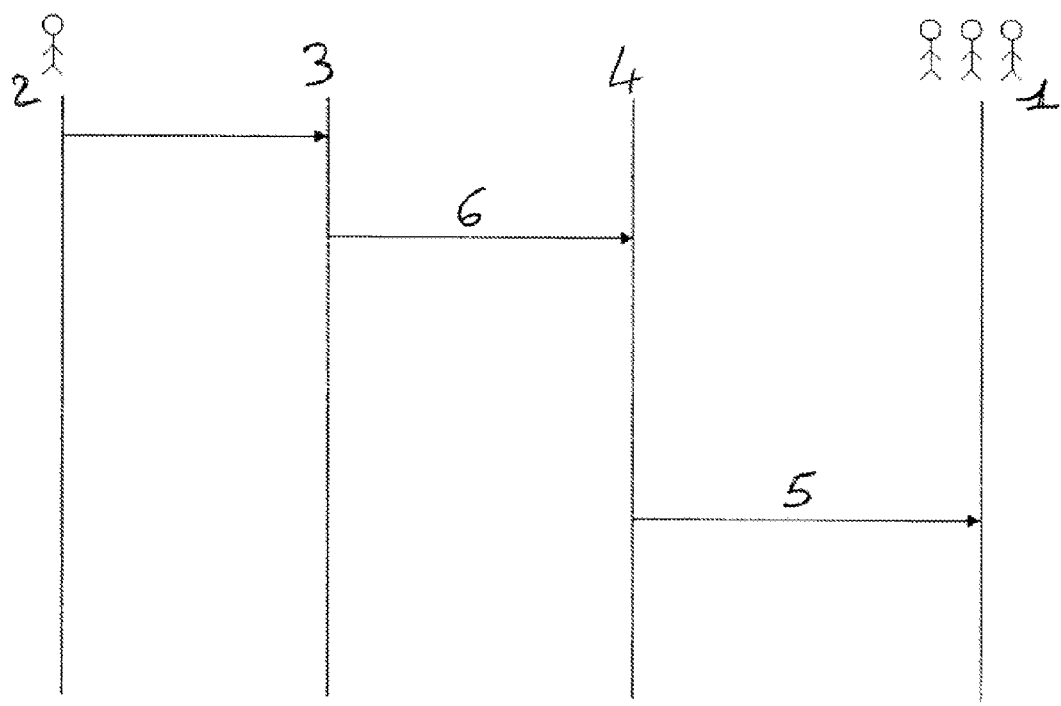

PROCESS FOR SENDING AN ELECTRONIC FILE TO AT LEAST ONE CONTACT OF A USER

CROSS-REFERENCE TO RELATED APPLICATION

This application claims priority to and the benefit of European Patent Application Number 12305272.2, filed on Mar. 6, 2012, the entire disclosure of which is incorporated herein by reference.

BACKGROUND

The invention relates to a process for sending an electronic file to at least one contact of a user, such as an application for editing electronic files that comprises means for implementing such a process.

Currently, for sending an electronic file to at least one of his contacts, a user generally launches an electronic message application on his terminal, such as Microsoft Outlook®, Mozilla Thunderbird® or Lotus Notes®. Thus, by means of this application, the user creates a new electronic message, such as an email or a meeting invitation, fills said message with an electronic address of his contact and attaches the electronic file to said message, in order to send said message with said attached file to said contact.

In particular, when the electronic file contains information about contacts of the user to which said file should be sent, such as the names of said contacts, the user generally opens said file by means of a dedicated edition application, parses said file to list said names, checks manually in at least one contact directory the existence of electronic addresses matching with each of said names and fills manually the new message with said electronic addresses.

Thus, for sharing electronic files with his contacts, a user has to execute manually several tedious steps and risks to make some mistakes, notably while entering the electronic addresses of his contacts. In particular, the user risks to forget some of his contacts.

SUMMARY

The invention aims to improve the prior art by proposing a process that is adapted to simplify the sending of an electronic file to contacts of a user that are referenced within said file.

For that purpose, and according to a first aspect, the invention relates to a process for sending an electronic file to at least one contact of a user, said process providing for the activation by said user of a sharing function, said process further providing for, upon said activation:
- parsing said electronic file for detecting information about said contact;
- checking in at least a contact directory the existence of an electronic address matching with said information;
- creating an electronic message comprising at least said electronic file and said electronic address;
- sending said electronic message to said contact through said electronic address.

According to a second aspect, the invention relates to an application for editing electronic files, said application comprising a sharing function for sending such an electronic file to at least one contact of a user, said application further comprises:

- means for parsing said electronic file upon the activation of said function by said user, said means being adapted to detect information about said contact;
- means for checking in at least one contact directory the existence of an electronic address matching with said information;
- means for creating an electronic message to be sent to said contact through said electronic address, said message comprising at least said electronic file and said electronic address.

BRIEF DESCRIPTION OF THE DRAWINGS

FIG. 1 is a schematic diagram of a process for sending an electronic file according to an embodiment of the present invention.

DETAILED DESCRIPTION

Other aspects and advantages of the invention will become apparent in the following description made with reference to the appended FIGURE representing schematically the steps of a process according to the invention.

In relation to this FIGURE, a process for sending an electronic file to at least one contact 1 of a user 2, such as an application 3 for editing electronic files that comprises means for implementing such a process, will be described below. In particular, the means for implementing the process can be directly embedded in the edition application 3, or they can be embedded through the addition of a dedicated plug-in to said application.

The electronic file can be in particular a text document, such as a .doc file, a .txt file, a .rtf file or a .pdf file, a spreadsheet file, such as a .xls file, a slideshow file, such as a .ppt file, or an hypertext file, such as a .html file. Thus, depending on the type of the electronic file, the edition application 3 can be respectively a text reader/edition application, such as Microsoft Word®, Openoffice Writer®, Acrobat Reader®, Ultra Edit®, Notepad® or Wordpad®, a spreadsheet application, such as Microsoft Excel® or Openoffice Calc®, or a slideshow reader/edition application, such as Microsoft Powerpoint®.

The process provides for the activation by the user 2 of a sharing function, the sending of the electronic file being initiated upon said activation. To do so, the edition application 3 comprises such a sharing function that the user 2 can activate for sending the electronic file to at least one of his contacts 1.

In particular, the sharing function can be activated by means of an interactive control on the interface of the dedicated edition application 3, such as an interactive link, an interactive button or an interactive tab in a context menu. To do so, the sharing function comprises means to provide such an interactive control on the interface (GUI, for Graphical User Interface) of the edition application 3, the user 2 activating said function by means of said control.

Thus, for triggering the process, the user 2 can first open the electronic file by means of the edition application 3, for example by clicking twice on said file with the left button of his mouse. Thus, the user 2 can activate the sharing function, for example by clicking with the left button of his mouse on the dedicated interactive control that is displayed on the interface of the edition application 3.

According to another embodiment, the sharing function can be activated by means of an interactive control which is implemented in the electronic file by means of the operating system of the terminal of the user 2. In particular, the interactive control can be a menu, an hyperlink or an interactive button. To do so, the user 2 can notably click on the electronic file with the right button of his mouse to display the interactive control, for example a menu, and click on a dedicated tab on said menu, as for example a "Share" tab, to activate the sharing function.

Once the sharing function has been activated, the process provides for parsing the electronic file for detecting information about the contact 1 of the user 2 to which said file should be sent. To do so, the edition application 3 comprises means for parsing the electronic file upon the activation of the sharing function by the user 2, said means being adapted to detect such information.

In particular, the information about the contact 1 can comprise at least a name of said contact, such as a surname, a first name and/or a nickname of said contact. The information about the contact 1 can also comprise an electronic address of said contact, a phone number of said contact, or a short login of an electronic message account of said contact.

The process further provides for checking in at least one contact directory the existence of an electronic address matching with the detected information. To do so, the edition application comprises means for such a checking.

The contact directory can be provided by the operating system of the terminal of the user 2, or by an electronic message application 4 which is generally used by the user 2, as for example Microsoft Outlook®, Mozilla Thunderbird® or Lotus Notes®.

The contact directory can also be provided by an enterprise application, such as the TOIP (for Telephony Over Internet Protocol) and VOIP (for Voice Over Internet Protocol) MyIC® application (for My Instant Communicator) provided by Alcatel-Lucent®. The contact directory can also be a directory according to the LDAP protocol (for Lightweight Directory Access Protocol).

In particular, when the information about a contact 1 comprises an electronic address of said contact, the process can provide for checking the existence of said electronic address in at least one contact directory, for instance in order to verify that said address matches with a know contact 1 of the user 2.

The process further provides for creating an electronic message 5 comprising at least the electronic file to be sent and the electronic address of the contact 1. To do so, the edition application 3 comprises means for creating such an electronic message 5.

In particular, the means for creating are adapted to send a notification 6 to an electronic message application 4 which is defined by default, for example an application among those mentioned above, said notification comprising at least the electronic file and the electronic address of the contact 1. Thus, the electronic message application 4 creates an electronic message 5, fills automatically the address field of said message with the electronic address of the contact 1 and attaches automatically the electronic file to said message.

Moreover, when the information about a contact 1 comprises an electronic address, and if said address exists in at least one contact directory, the means for creating can send said address into the notification 6.

The electronic message 5 can be an electronic mail, or a meeting invitation that the user 2 can schedule in the electronic calendar of the electronic message application 4, the concerned contacts 1 of said user receiving said invitation through their own electronic message application.

Moreover, the electronic message 5 can further comprise the name of the electronic file. To do so, the means for creating of the edition application 3 can be adapted to fill the electronic message 5 with the name of the electronic file. In particular, the means for creating are adapted to send the name of the electronic file to the electronic message application 4 through the notification 6.

Besides, the body of the electronic message 5 can be filled with a predefined text which is created from a template, said template comprising static portions of text that can be configured by the user 2 and variable fields that can be filled with information extracted from the electronic file, such as the subject and/or the name of said file, or the name of the contact(s) 1 said file is to be sent.

Once the electronic message 5 is correctly filled, the user 2 can send it to his contacts 1 with the attached electronic file, for example by clicking with the left button of his mouse on a "Send" interactive button of the electronic message application 4. Moreover, in order to further simplify the sending of the electronic message 5, the application 4 can be set to automatically send said message.

This process allows the user 2 to share an electronic file with his contacts 1 in one single action. In particular, the user 2 does not have to fill by himself the electronic message 5 with the list of his contacts 1, or to attach manually the electronic file to said message. Thus, the user 2 is ensured not to forget any of his contacts 1, nor to forget attaching the electronic file to the electronic message 5.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to assist the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A system for sending an electronic file, the system comprising:
 a processor; and
 a memory, wherein the memory stores instructions that, when executed by the processor, cause the processor to:
  open the electronic file to display an interactive control;
  receive an activation of a sharing function from the interactive control to share the electronic file; and
  in response to receiving the activation of the sharing function:
   process a text in the electronic file to detect information within the text associated with a user contact;
   identify address information of the user contact based on the detected information;
   send a notification to an email application for sending a message to the user contact, the notification comprising the electronic file and the address information;
   generate the message comprising the address information for sending to the user contact via the email application; and attach the electronic file to the message, wherein the attaching of the electronic file is without the user manually attaching the electronic file to the message.

2. The system of claim 1, wherein the information associated with the user contact comprises at least one of an address, a phone number, and a short login of an electronic message account.

3. The system of claim 1, wherein the identifying the address information of the user contact comprises searching a directory for address information matching the detected information associated with the user contact.

4. The system of claim 1, wherein the instructions, when executed, further cause the processor to automatically populate an address field of the message with the address information of the user contact.

5. The system of claim 1, wherein the instructions, when executed, further cause the processor to automatically attach the electronic file to the message.

6. The system of claim 1, wherein the message comprises an electronic mail or a meeting invitation.

7. The system of claim 1, wherein the instructions, when executed, further cause the processor to provide a name of the electronic file to the application for sending the message to the user contact.

8. The system of claim 1, wherein the message comprises a static portion and a variable portion, the static portion configurable by a user and the variable portion configured to be automatically filled in with information from the electronic file.

9. The system of claim 1, wherein processing of the electronic file is initiated by activating an interactive control of an application for accessing the electronic file.

10. The system of claim 1, wherein processing the electronic file comprises parsing the electronic file, and the address information of the user contact is identified based on the parsing.

11. A method for sending an electronic file, the method comprising:
   opening, by one or more processors, the electronic file to display an interactive control;
   receiving, by one or more processors, an activation of a sharing function from the interactive control to share the electronic file; and
   in response to receiving the activation of the sharing function:
      processing, by one or more processors, a text in the electronic file to detect information within the text associated with a user contact;
      identifying, by the one or more processors, address information of the user contact based on the detected information;
      sending, by one or more processors, a notification to an email application for sending a message to the user contact, the notification comprising the electronic file and the address information;
      generating, by one or more processors, the message comprising the address information for sending to the user contact via the email application; and
      attaching, by one or more processors, the electronic file to the message, wherein the attaching of the electronic file is without the user manually attaching the electronic file to the message.

12. The method of claim 11, wherein the information associated with the user contact comprises at least one of an address, a phone number, and a short login of an electronic message account.

13. The method of claim 11, wherein the identifying the address information of the user contact comprises searching, by the one or more processors, a directory for address information matching the detected information associated with the user contact.

14. The method of claim 11, further comprising automatically populating, by the one or more processors, an address field of the message with the address information of the user contact.

15. The method of claim 11, further comprising automatically attaching, by the one or more processors, the electronic file to the message.

16. The method of claim 11, wherein the message comprises an electronic mail or a meeting invitation.

17. The method of claim 11, further comprising providing, by the one or more processors, a name of the electronic file to the application for sending the message to the user contact.

18. The method of claim 11, wherein the message comprises a static portion and a variable portion, the static portion configurable by a user and the variable portion configured to be automatically filled in with information from the electronic file.

19. The method of claim 11, wherein the processing of the electronic file is initiated by activating an interactive control of an application for accessing the electronic file.

20. The method of claim 11, wherein the processing of the electronic file comprises parsing the electronic file, and the address information of the user contact is identified based on the parsing.

21. A system for sending an electronic file, the system comprising:
   a means for opening the electronic file to display an interactive control;
   a means for receiving an activation of a sharing function from the interactive control to share the electronic file; and
   a means for performing, in response to receiving the activation of the sharing function:
      processing a text in the electronic file to detect information within the text associated with a user contact, the information comprises at least one of an address, a phone number, and a short login of an electronic message account;
      identifying address information of the user contact based on the detected information;
      send a notification to an email application for sending a message to the user contact, the notification comprising the electronic file and the address information;
      generating the message comprising the address information for sending to the user contact via the email application; and
      attaching the electronic file to the message, wherein the attaching of the electronic file is without the user manually attaching the electronic file to the message.

* * * * *